D. McFarland,
Card Setting Machine.
No. 97,667. Patented Dec. 7, 1869.
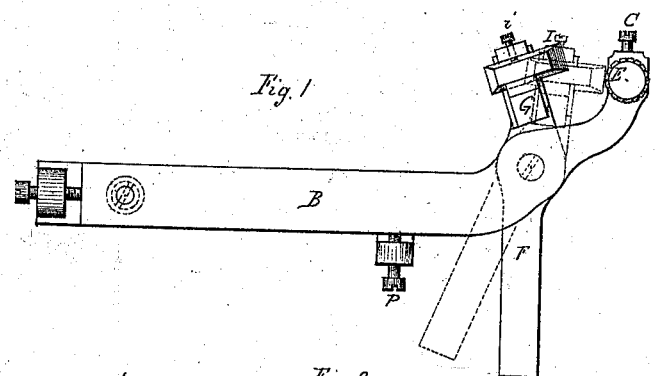
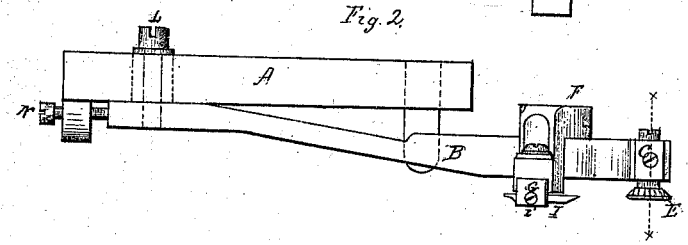
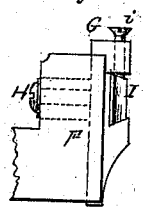
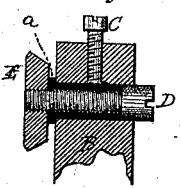
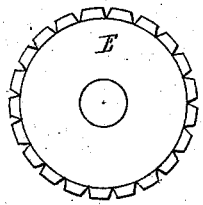
Witnesses
D. McFarland
Inventor
By his Attorney

United States Patent Office.

DAVID McFARLAND, OF WORCESTER, MASSACHUSETTS.

Letters Patent No. 97,667, dated December 7, 1869.

IMPROVEMENT IN CUTTER FOR CARD-SETTING MACHINE.

The Schedule referred to in these Letters Patent and making part of the same.

*To all whom it may concern:*

Be it known that I, DAVID McFARLAND, of Worcester, in the county of Worcester, and State of Massachusetts, have invented a new Improvement in Cutter for Card-Setting Machines; and I do hereby declare the following, when taken in connection with the accompanying drawings, and the letters of reference marked thereon, to be a full, clear, and exact description of the same, and which said drawings constitute part of this specification, and represent, in—

Figure 1, a side view,
Figure 2, a top view,
Figure 3, a front view of the vibrating cutter,
Figure 4, a section through the fixed cutter on line x x, and in
Figure 5, a side view of the fixed cutter enlarged.

This invention relates to an improvement in cutters for machines for the setting of teeth into card-clothing; but it is alike applicable to other machines where the wire is to be cut in similar manner; therefore, while I describe my invention as applied to card-setting machines, I do not wish to be understood as limiting myself to that machine only; and My invention consists—

First, in the construction of the fixed cutter, so as to be rotated upon a centre to present a new cutting point to the vibrating cutter, whenever one has become dulled or incapable of perfect work.

Second, in the arrangement of a cutter, thus constructed, in a sleeve within a bearing, so that by means of the said sleeve the cutter may be adjusted relatively to the vibrating cutter.

Third, in the arrangement of the fixed cutter in a carriage or holder, made adjustable in the cutter lever, so that the holder may be raised or lowered, as the case may be, without disturbing the relative position of the vibrating to the fixed cutter.

Fourth, in the arrangement of the two cutters, thus constructed upon a single bar, so that the two may be adjusted together to bring their cutting edges to the position desired.

To enable others skilled in the art to construct and use my invention, I will proceed to describe the same, as illustrated in the accompanying drawings.

A is the plate or frame of the machine, to which the bar B is attached.

The said bar B is formed at its inner end so as to receive a sleeve, a, as denoted in solid black, fig. 4, the sleeve being held in position by the set-screw C.

Through the said sleeve a screw, D, passes freely, that is, the internal diameter of the sleeve being the same or larger than the extreme diameter of the screw-thread, and to the inner end of the said sleeve I fix the adjustable fixed cutter E, which is tapped centrally to receive the screw D, as seen in figs. 2 and 4, so that the said screw D will bind the cutter E hard against the sleeve, making it, when thus bound together, practically a part of the sleeve.

The cutter itself is notched, grooved, or serrated upon its edge, as seen in fig. 5, each of the notches being designed as cutting-points on the said cutter, and these notches may be of any desired form, the object being that the notch holds the wire, or serves as a guide for the wire to keep it in position while being cut.

To adjust the cutter E to or from the bar B, so as to bring it to the proper relative position to the vibrating cutter, loose the screw C, and move the sleeve to which the cutter E is fixed, so as to bring the cutter into the desired position, then reset the screw upon the sleeve and the cutter is firmly held.

After one of the notches has been used until it is dull or impractical for further use, turn the cutter E to present a new notch. This is done by loosening the screw D, and turning the cutter E to the desired position and resetting the screw D; thus the relative position of the cutter is not changed.

F is the vibrating cutter-lever, pivoted to the bar B, and actuated by the mechanism of the machine to swing the upper end toward and from the fixed cutter E.

G is the fixed cutter-holder, arranged in the upper end of the lever F, as seen in figs. 1, 2, and 3, guides being formed therein, and a set-screw, H, passed through a slot in the head, into the holder, as seen in fig. 3, so that the said holder may be adjusted vertically in the lever F.

I is a cutter, set into the holder G, and there firmly bound by the set-screw i, bearing upon its edge the cutter E, being arranged so that the cutter I will, when moved forward to the position denoted in broken lines, fig. 1, pass on to the surface of the fixed cutter, cutting the wire which lies in the notch or groove of the fixed cutter.

The fixed cutter is adjustable vertically upon the lever F, so that it may be raised or lowered to present a new cutting-point so soon as one shall have become worn or dulled.

The bar B is hung or pivoted to the plate A by a screw, L, a slot being formed through the plate A, so as to permit the movement of the bar forward or back.

A set-screw, N, is arranged at the rear of the bar B, and through a lug on the plate A, bearing against the rear end of the bar B, to adjust the bar out or in, as may be desired; and beneath the bar B an adjusting-screw, P, is arranged for varying the elevation of the cutters, as may be desired.

By this construction, the cutters once set in the machine may be used for a great length of time without the necessity of removing them from the machine, whereas, as heretofore constructed, so soon as the cutter became dulled at one point, it has been necessary to remove it from the machine to be sharpened.

Having fully described my invention,

What I claim as new and useful, and desire to secure by Letters Patent, is—

1. The cutter E, constructed with the notches, grooves, or serrated edge, and adjustable around its centre, so as to present different cutting-points and form a guide for the wire, substantially as described.

2. In combination with the circular cutter E, the sleeve $a$, with the set-screws C and D, for the purpose of adjusting the cutter, substantially as set forth.

3. The arrangement of the vibrating cutter I in the holder G, made adjustable on the lever F, substantially as set forth.

4. The combination of the fixed vibrating cutters E and I, arranged upon the bar B, so that both may be adjusted, substantially as herein set forth.

D. McFARLAND.

Witnesses:
JOHN H. SHUMWAY,
A. J. TIBBITS.